US012728395B2

(12) United States Patent
Dann et al.

(10) Patent No.: US 12,728,395 B2
(45) Date of Patent: Sep. 8, 2026

(54) THERMOKINETIC MIXER FOR MELT-MIXING WASTE PLASTIC PRODUCTS

(71) Applicant: Greenbul Engineering EOOD, Plovdiv (BG)

(72) Inventors: Reimund Dann, Warendorf (DE); Alexander Huwe, Bad Vilbel (DE)

(73) Assignee: Greenbul Engineering EOOD, Plovdiv (BG)

( * ) Notice: Subject to any disclaimer, the term of this patent is extended or adjusted under 35 U.S.C. 154(b) by 1034 days.

(21) Appl. No.: 17/637,236

(22) PCT Filed: Nov. 13, 2020

(86) PCT No.: PCT/DE2020/100970
§ 371 (c)(1),
(2) Date: Feb. 22, 2022

(87) PCT Pub. No.: WO2021/155875
PCT Pub. Date: Aug. 12, 2021

(65) Prior Publication Data

US 2022/0339588 A1 Oct. 27, 2022

(30) Foreign Application Priority Data

Feb. 4, 2020 (DE) ..................... 10 2020 102 819.9

(51) Int. Cl.
*B01F 27/708* (2022.01)
*B01F 27/053* (2022.01)
(Continued)

(52) U.S. Cl.
CPC .......... *B01F 27/708* (2022.01); *B01F 27/053* (2022.01); *B01F 27/071* (2022.01);
(Continued)

(58) Field of Classification Search
CPC ................ B01F 27/071; B01F 27/0722; B01F 27/0724; B01F 27/70
See application file for complete search history.

(56) References Cited

U.S. PATENT DOCUMENTS 1,555,964 A 10/1925 Guedel
3,591,146 A 7/1971 Sutter
(Continued)

FOREIGN PATENT DOCUMENTS

DE 2702795 A1 * 5/1984
EP 0 241 723 A2 10/1987
(Continued)

OTHER PUBLICATIONS

International Search Report of PCT/DE2020/100970, mailed Feb. 23, 2021.

*Primary Examiner* — Claire X Wang
*Assistant Examiner* — Patrick M McCarty
(74) *Attorney, Agent, or Firm* — Collard & Roe, P.C.

(57) ABSTRACT

A thermokinetic mixer for melt mixing plastics waste includes a housing enclosing a mixing chamber, and a shaft protruding through the mixing chamber and connectable to a drive unit. In the mixing chamber, Y-shaped mixing blades protrude radially from the shaft, wherein the free end of the mixing blades protruding into the mixing chamber is cuboid, and the end opposite the free end of the mixing blades has two legs in each case having at least one through bore. The
(Continued)

shaft has polygonal recesses, in which recesses the legs can be fastened by a fastener protruding through the through bores.

17 Claims, 3 Drawing Sheets

(51) Int. Cl.

| | |
|---|---|
| ***B01F 27/07*** | (2022.01) |
| ***B01F 27/072*** | (2022.01) |
| ***B01F 27/112*** | (2022.01) |
| ***B01F 27/191*** | (2022.01) |
| ***B01F 35/41*** | (2022.01) |
| ***B01F 35/93*** | (2022.01) |
| *B01F 35/90* | (2022.01) |
| *B01F 101/00* | (2022.01) |

(52) U.S. Cl.

CPC ...... *B01F 27/0722* (2022.01); *B01F 27/0724* (2022.01); *B01F 27/112* (2022.01); *B01F 27/191* (2022.01); *B01F 35/4122* (2022.01); *B01F 35/93* (2022.01); *B01F 2035/98* (2022.01); *B01F 2101/2805* (2022.01)

(56) References Cited

U.S. PATENT DOCUMENTS

| | | | | | |
|---|---|---|---|---|---|
| 4,478,515 | A | | 10/1984 | Tobin | |
| 5,580,170 | A | * | 12/1996 | Holley | B01F 27/70 366/168.1 |
| 5,626,421 | A | | 5/1997 | Campbell | |
| 5,895,790 | A | | 4/1999 | Good | |
| 6,709,146 | B1 | | 3/2004 | Little et al. | |
| 9,387,640 | B1 | * | 7/2016 | Rice | B01F 35/451 |
| 2007/0003654 | A1 | * | 1/2007 | Morimoto | B29B 7/14 264/211 |
| 2013/0016581 | A1 | * | 1/2013 | Doerr | B65D 88/68 366/349 |
| 2014/0355372 | A1 | * | 12/2014 | Black | B01F 35/881 366/8 |
| 2020/0254402 | A1 | * | 8/2020 | Detloff | B01F 27/071 |

FOREIGN PATENT DOCUMENTS

| | | | |
|---|---|---|---|
| EP | 0 976 442 | A2 | 2/2000 |
| EP | 1 365 853 | B1 | 1/2006 |
| WO | 01/85322 | A1 | 11/2001 |

* cited by examiner

THERMOKINETIC MIXER FOR MELT-MIXING WASTE PLASTIC PRODUCTS

CROSS REFERENCE TO RELATED APPLICATIONS

This application is the National Stage of PCT/DE2020/100970 filed on Nov. 13, 2020, which claims priority under 35 U.S.C. § 119 of German Application No. 10 2020 102 819.9 filed on Feb. 4, 2020, the disclosure of which is incorporated by reference. The international application under PCT article 21 (2) was not published in English.

The invention relates to a thermokinetic mixer for melt mixing plastics waste comprising a housing enclosing a mixing chamber, to a shaft protruding through the mixing chamber and connectable to a drive unit, and to mixing blades protruding substantially radially from the shaft.

Mixers for mixing different building materials, such as mortar or concrete, are well known. In order to withstand the high stress on the mixer housing, mixers are usually made from iron or steel, which has a high level of wear resistance, at least on its surface, in order to withstand, for as long as possible, the wear tendencies resulting from the friction on the abrasive mix material. A mixer of this type is known from EP 0 241 723 A2.

A mixing device having a mixing drum and a mixing shaft mounted at the ends of the mixing drum is known from EP 0 976 442 A2. The mixing shaft has radially outwardly projecting blade arms, at the ends of which blades are arranged. The blades have wear protection in the form of a hard overlay weld made from a wear-resistant material.

U.S. Pat. No. 3,591,146 A describes a fastening device for a mixing and kneading machine with a rotating worm shaft, consisting of a housing that can be fastened coaxially to the housing of the mixing and kneading machine and a separate, independently driven, rotatable shaft with blades radially arranged therein.

From U.S. Pat. No. 5,895,790 A, a thermokinetic mixer is known which is used for melt mixing. In this case, polymer mixture and thermoset waste material are converted back into usable products by first moulding a thermoset material of predictable quality from dissimilar polymers and then melt mixing the thermoset material with a thermoplastic material into usable products.

EP 1 365 853 B1 describes a generic mixer in which attachments are fastened to a shaft and the attachments are arranged on the shaft in such a way that the particles in the mixer collide with a plurality of attachments when the shaft rotates.

A disadvantage of the mixers known from the prior art is that the parts of the mixers, in particular the mixing blades, are complexly connected to one another and to the driving shaft, and dismantling is complex and time-consuming.

The invention is based on the object of improving the durability of a mixer and its maintenance.

The object is achieved by the invention specified in claim 1. Advantageous embodiments of the invention are specified in the dependent claims.

The object is achieved according to the invention in that a thermokinetic mixer for melt mixing plastics waste is provided, comprising a housing enclosing a mixing chamber, a shaft protruding through the mixing chamber and connectable to a drive unit and Y-shaped mixing blades protruding radially from the shaft in the mixing chamber, wherein the free end of the mixing blades protruding into the mixing chamber is cuboid and the end opposite the free end of the mixing blades has two legs in each case having at least one through bore, wherein polygonal recesses are provided in the shaft, in which recesses the legs can be fastened by means of fastening means protruding through the through bores. The shaft is advantageously designed to be polygonal in portions, in particular in the region which is used to fasten the mixing blades, namely the recesses. The recesses can in particular represent surfaces of the polygonal portions, the legs being able to be brought into contact with the polygonal recesses with their correspondingly shaped contact surfaces. Due to the design of the mixing blades according to the invention, they can be securely connected to the shaft in a force- and torque-transmitting manner, with the mixing blades nonetheless being easy and quick to assemble and dismantle. This is a major advantage of the invention. In particular the mixing blades have to be replaced regularly due to the high load. Another important advantage is their cuboid design, since if the mixing blades wear on one side, they can be easily dismantled and reassembled in the opposite orientation.

With the aid of the mixer according to the invention, plastics waste can be mixed in such a way that they melt and behave like jelly, so that the plastics waste filled into the mixer results in a compound that can be shaped into new products in subsequent processing steps. The mixer according to the invention thus offers a form of recycling in which different types of mixed plastics are processed in such a way that new products can be manufactured from them. The energy required to melt the plastics waste arises in particular from the fact that the plastics waste is sheared by the mixing blades on the one hand and collide with the mixing blades, the mixing chamber and with each other, so that kinetic energy is generated which results in the heating of the plastics waste.

The Y-shaped end of the mixing blades has two legs, each with at least one through bore for a fastening means. The mixing blades can thus be fastened in the recesses of the shaft in a simple manner. In one embodiment, the shaft is designed to be round, at least in portions. The polygonal recesses of the shaft can be milled into a round shaft, for example, so that, in one embodiment, round portions are provided between the polygonal recesses. The diameter of the shaft can vary along its length, i.e. the round portions can in turn have a different diameter, such as other regions of the shaft, such as the end regions.

The legs of the mixing blades advantageously have an outer surface, in particular a contact surface, which is designed to be complementary to the outer surface of the recesses and which can be brought into contact with the outer surface of the recesses. In particular, the length of the contact surface of the legs is designed in such a way that it corresponds to the length of the outer surface of the recess, so that the leg ends are substantially flush with the edges of the polygonal recess. In the surfaces of the polygonal portions that form the recesses, there is in particular at least one bore for receiving a fastening means protruding through the mixing blades, so that the mixing blades can be fastened in the recesses in a simple manner.

Alternatively, means can be provided in the recesses which, for example, comprise receptacles for the protruding fastening means and which are plugged onto the shaft and into the recesses or fastened in some other way. This could, for example, be a slotted ring with bores for the fastening means, which can be plugged into the recesses.

The number of mixing blades in the mixing chamber can be varied depending on the application.

In a preferred embodiment, the recesses are milled into a round shaft. However, it can also be advantageous if an overall polygonal shaft is provided on which there are bores at a distance from one another for fastening the mixing blades. In order to additionally secure the mixing blades axially, it can be advantageous that at least one spacer sleeve is provided between two mixing blades, which spacer sleeve can be slipped onto the shaft, and the inner surface of the spacer sleeve is round, polygonal, in particular complementary, i.e. preferably designed to match or be congruent to the shaft or its surface. As a result, the spacer sleeve is held on the shaft so that it cannot rotate. The spacer sleeve can have a round, flat surface and consist of plastics material or metal. In particular, the spacer sleeve can be made from hard steel, chilled cast iron, Hardox or a combination thereof. The number of spacer sleeves between two mixing blades can be varied as required. The spacer sleeves can be varied in width and thickness so that they can be adapted to the corresponding application. It can be advantageous to secure the spacer sleeves radially with a locking ring or a clamp.

In one embodiment, it can be provided that the mixing blades are made from hard steel, chilled cast iron, Hardox or a combination thereof. It has been shown that this considerably reduces the abrasion and that the maintenance intervals can be extended.

The free ends of the mixing blades are designed so as to be cuboid. The mixing blades have a large base surface, which promotes mixing. The cuboid mixing blades can have inclined, straight or round corners and side surfaces.

It is preferred if the mixing blades are arranged in the mixing chamber in such a way that their base surfaces lie in a plane aligned transversely to the shaft. As a result, the mixing blades are in particular in planes that are parallel to one another. However, it can also be preferred if only some of the mixing blades are arranged in the mixing chamber in such a way that their base surfaces lie in a plane aligned transversely to the shaft. Other mixing blades, or a further part of the mixing blades contained in the mixing chamber, can be arranged in the mixing chamber in a different manner.

In order to keep the temperature in the mixing chamber constant, it can be advantageous that there is cooling in the housing. It has proven to be particularly advantageous if the cooling is provided in the housing, since this achieves effective cooling of the mixing chamber, but at the same time also prevents excessive cooling of the mix material. As a coolant, a fluid, such as water, air or the like, can be used and can, for example, be adapted depending on the location. The fluid used for cooling can circulate in a circuit so that the heat extracted from the mixing chamber can be used for another process, for example.

Furthermore, it is advantageous if the wall of the housing, which wall forms the mixing chamber and can be brought into contact with the mix material, consists of a wear plate made in particular from hard steel, chilled cast iron, Hardox or a combination thereof. The housing and in particular the wall of the housing delimiting the mixing chamber advantageously consists of three walls, wherein the first wall which can be brought into contact with the mix material consists of a closure plate. A cooling system can advantageously be arranged between the second and third walls.

The mixing blades in the mixing chamber are advantageously arranged one behind the other in rows and the base surfaces of the mixing blades are aligned parallel to one another. Thereby it is achieved that the plastics waste moves back and forth between the base surfaces, as a result of which their kinetic energy is increased and the melting process can be improved.

The mixing chamber is advantageously designed in the shape of a cylinder and comprises a mixing trough and a mixing chamber cover that can be fastened to the mixing trough. In particular, the shaft rotates around the axis of the mixing trough. The mixing trough, in particular the inner surface of the mixing trough, can have a coating which reduces sticking of the mix material. This can be a plastics coating or a metal coating, for example. The mixing trough itself and also the mixing chamber cover are preferably made from metal. The mixing chamber cover can be fastened to the mixing trough via flange connections. In order to simplify the handling of the mixing chamber cover, hooks or handles can be provided.

On the underside of the mixing trough, an openable flap is preferably provided, through which the mix material can be discharged. The flap can be opened manually or automatically.

The housing of the mixer advantageously comprises at least three side walls, in particular provided with openings for the shaft and arranged axially one behind the other, which walls are aligned substantially parallel to one another and can be fastened, for example, to a housing base plate aligned substantially perpendicularly to said walls. A compact housing is thus provided which forms an easily transportable unit.

The first and second side walls of the housing advantageously form side walls of the mixing chamber. It is therefore possible to dispense with additional side walls of the mixing chamber. The mixing trough of the mixing chamber can, for example, be detachably fastened to the first and second side walls by means of fastening means or permanently by means of welding.

In order to feed mix material to the mixing chamber, a feed chamber, for example a cylindrical feed chamber, can be connected upstream of the mixing chamber. In particular, conveying means are provided in the feed chamber, which convey mix material from the feed chamber through an opening in the side wall into the mixing chamber. The conveying means can be, for example, a worm conveyor, a spiral conveyor or an eccentric worm-drive pump. Depending on the application, different conveying means can be used. In contrast to the worm conveyor, the spiral conveyor lacks a worm shaft in the middle, which has the advantage that maintenance and assembly of the spiral conveyor is easy. In the embodiment of the conveying means as an eccentric worm-drive pump, the mixing trough can be designed as a stator in which a rotor, designed in principle as a round thread screw, moves. One advantage of the eccentric worm-drive pump is that it can be used very well for dosing the mix material in conjunction with the appropriate measurement and control technology.

In order to feed mix material to the feed chamber, the feed chamber can have an opening on its upper side. The opening can be funnel-shaped. A closure means, such as a cover, which can be attached to the opening, prevents undesired material from entering the feed chamber.

It is preferred that the first and the second or third side wall each have a bearing for supporting the shaft. Because the distance between the bearings is small, undesired shaft vibrations are reduced. In addition, the bearings are easily accessible for maintenance work. The bearings can be shaft bearings known to a person skilled in the art, for example roller bearings or slide bearings.

The invention is explained in more detail below using an embodiment of the invention which is shown in the drawing, in which.

Figure 1:
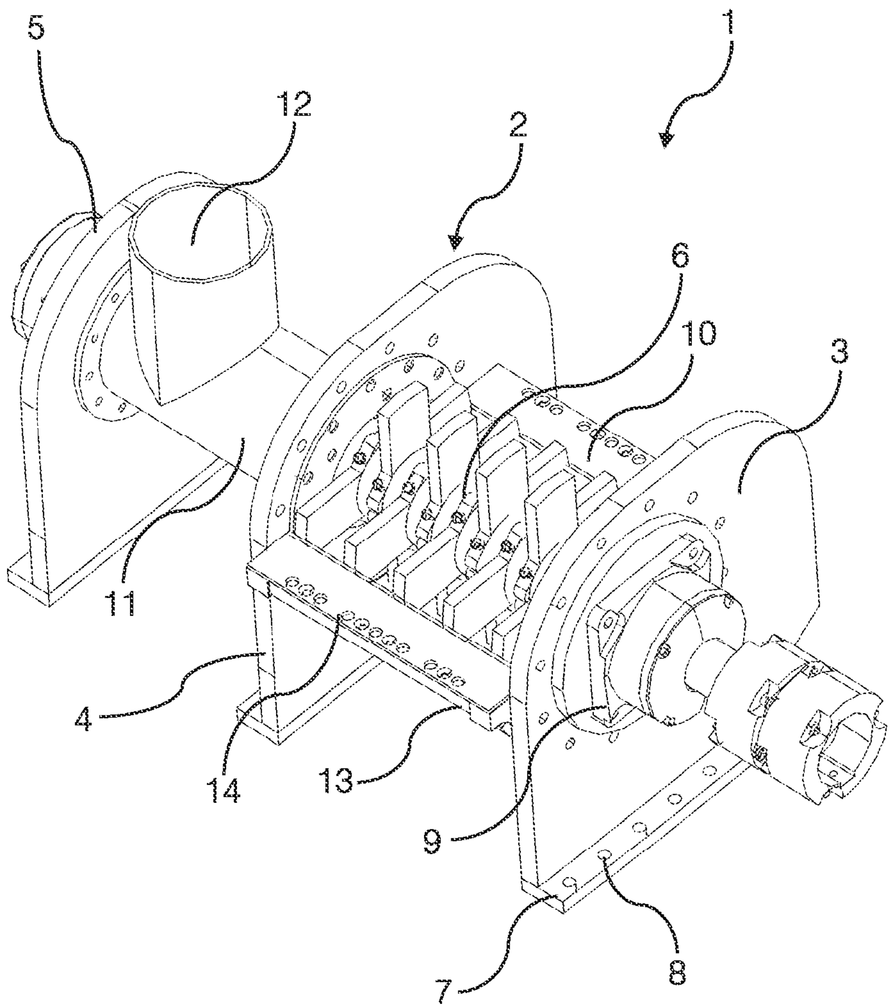
FIG. 1 is a perspective view of a preferred embodiment of a mixer.

FIG. 1 shows a perspective view of a preferred embodiment of a mixer. The mixer 1 is designed as a thermokinetic mixer 1. The housing 2 of the mixer 1 has three side walls 3, 4, 5 which are aligned parallel to one another and are arranged one behind the other, each of which has an opening for a shaft 6 protruding through the side walls 3, 4, 5. The side walls 3, 4, 5 can be fastened in a simple manner to a base plate (not shown). For fastening to the base plate, a flange 7 with bores 8 can be provided.

The shaft 6 can be operatively connected to a drive unit, for example via a shaft coupling. A gear motor in foot, flange or slip-on design can be used as the drive. The use of an electro-hydraulic drive or a pure electric motor is also possible.

The shaft 6 is secured by bearings 9 fitted into the openings in the first side wall 3 and third side wall 5. Due to the short construction and the small distance between the bearings, vibrations of the shaft 6 can be minimised and a high level of flexural rigidity is achieved. Depending on the embodiment, the bearings 9 can also be arranged in the openings in the first side wall 3 and second side wall 4, so that the bearing spacing is shortened again, which has a positive effect on the flexural rigidity of the shaft 6.

The first side wall 3 and the second side wall 4 of the housing 2 can at the same time form side walls of a mixing chamber 10.

A cylindrical feed chamber 11, which is enclosed by the second and third side walls 4, 5, is arranged adjacent to the mixing chamber 10. On the upper side, the feed chamber 11 has a duct-shaped opening 12, via which the mix material can be introduced into the feed chamber 11. The feed chamber 11 can be arranged horizontally, wherein the feed chamber 11 can also be inclined. The feed chamber 11 can have different sizes depending on the delivery rate and can be made from stainless steel, for example. For conveying the mix material from the feed chamber 11 into the mixing chamber 10, a conveying means (not shown) is provided in the feed chamber 11. This can be, for example, a worm conveyor which has a worm thread firmly connected to the shaft 6. The worm thread can be welded to the shaft 6, connected thereto via webs or manufactured in one part with the shaft 6. Alternatively, the worm conveyor can be fastened to a sleeve, which in turn can be slipped onto the shaft 6. The sleeve can in turn be connected to the shaft 6 by means of screws or in some other way. Instead of a worm conveyor, a spiral conveyor without a shaft can also be used. In this embodiment, the bearings 9 of the shaft 6 would have to be integrated in the first side wall 3 and the second side wall 4. The worm thread can be designed as a full-blade worm with a continuous thread, as a band thread or as a blade worm.

The mix material is conveyed from the feed chamber 11 through the opening in the second side wall 4 into the mixing chamber 10 connected downstream of the feed chamber 11. For the embodiment that the shaft 6 is secured by bearings provided in the first and second side walls 3, 4, the feed chamber 11 can, for example, be arranged at an angle so that mix material falls into the mixing chamber 10 by gravity. Alternatively, a conveying means can be provided that conveys the mix material from the feed chamber 11 through an opening in the side wall 4 into the mixing chamber 10, for example a slide.

The mixing chamber 10 is designed so as to be cylindrical and comprises a mixing trough 13 and a mixing chamber cover (not shown), which are fastened to one another via a flange connection 14. The mixing chamber 10 can also be designed in one piece, in which case an opening that can be closed with a closure means can be provided in the upper side of the mixing chamber 10 so that the mixing chamber 10 is accessible. An opening (not shown) is integrated in the mixing trough 13 and can be closed with a closure means, for example a cover. The opening and closing of the opening in the mixing trough 13 can take place automatically or manually. Mix material can be removed through the opening in the mixing trough 13. In the mixing chamber 10, sensors can be provided which, for example, determine the temperature of the mix material.

The shaft 6 protruding through the mixing chamber 10 preferably rotates about the axis of the mixing chamber 10. As shown in FIG. 1 and also in FIG. 2, the shaft 6 is designed so as to be multi-sided or polygonal in portions and can have different shaft diameters. For example, a shaft portion in the feed chamber 11 can have a larger shaft diameter than a shaft portion in the mixing chamber 10.

Figure 2:
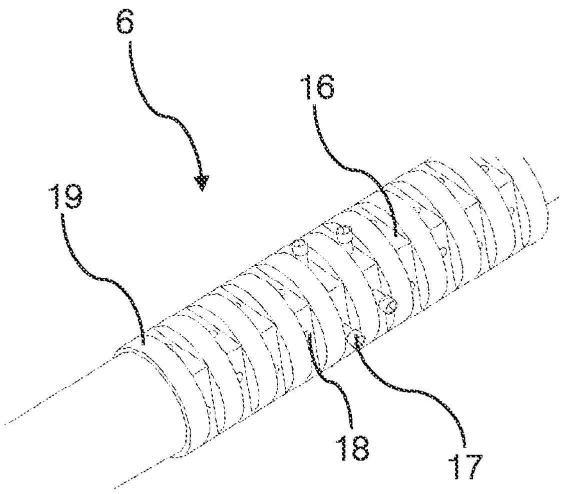
FIG. 2 is a perspective view of a shaft.
Figure 3:
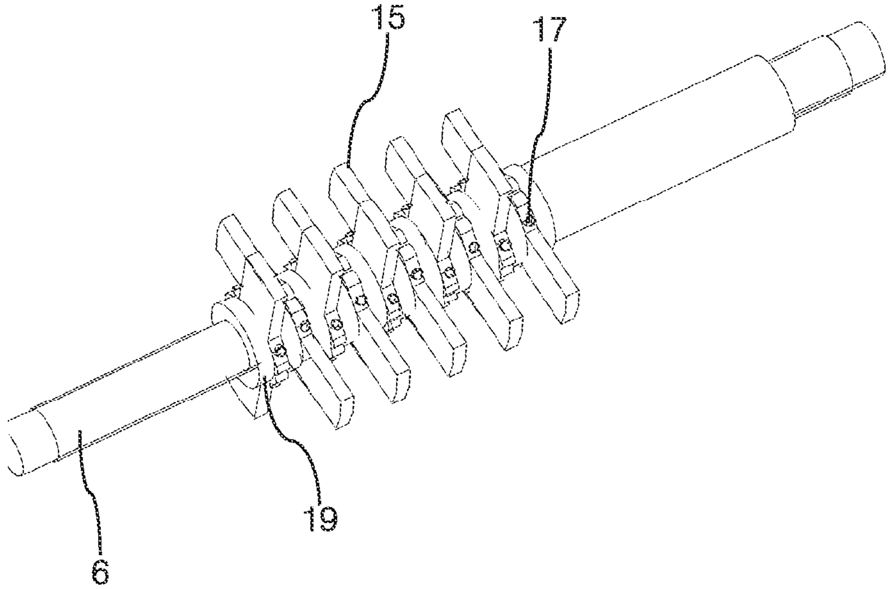
FIG. 3 is a perspective view of a shaft with mixing blades.

As can be seen in FIGS. 1 and 3, mixing blades 15 are arranged on the shaft 6 and extend radially from the shaft 6 protruding through the mixing chamber 10. The number of mixing blades 15 can be varied depending on the application. The mixing blades 15 can consist of Hardox, for example. As shown in FIG. 2, the shaft 6 has recesses 16 which are designed to be polygonal, i.e. in which polygonal portions are provided and which are used to receive the mixing blades 15. The mixing blades 15 can be fastened in the bores 18 by means of fastening means 17. The recesses 16 can be milled into a round shaft, for example.

In the embodiment according to FIG. 2, the shaft 6 has square recesses 16, between which annular portions 19 are provided which can arise through a non-machined region of the shaft 6. The width of the annular portions 19 can be varied depending on the application and, for example, correspond to the width of the recesses 16 or be a multiple thereof. It can also be provided that there are no annular portions between the recesses 16. Two oppositely arranged mixing blades 15 can be fastened in the square recesses 16.

Figure 4:
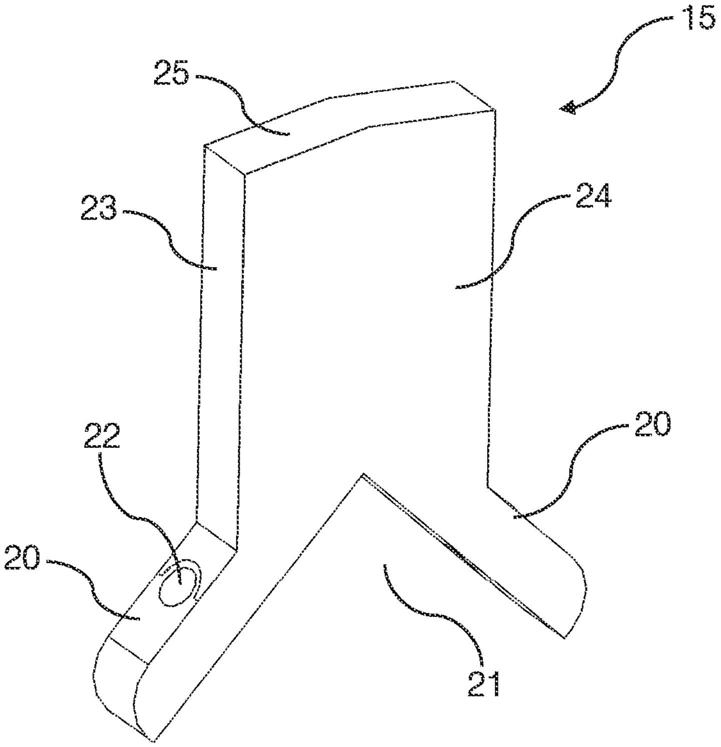
FIG. 4 is a perspective view of a mixing blade.
Figure 5:
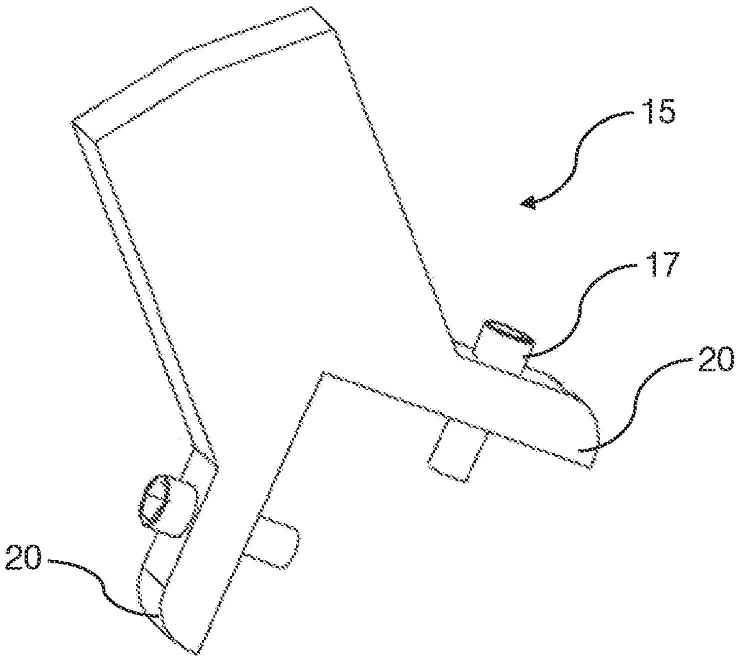
FIG. 5 is a further perspective view of a mixing blade with fastening means.

As can be seen in FIG. 4 and FIG. 5, the mixing blades 15 are Y-shaped and have two legs 20 which, for example, are at an angle of 90° to one another and thereby form a wedge-shaped recess 21.

The wedge-shaped recess 21 is designed in such a way that it fits flush into the recess 16 of the shaft 6. In other words, the width and length of the legs 20 are adapted to the width and length of the polygonal recesses 16. A square recess 16 comprises in particular four surfaces which can be brought into contact with contact surfaces of the legs 20. For fastening the mixing blades 15 into the recesses 16, fastening means 17 can be used, which fastening means are screwed through through bores 22 provided in the legs 20 and are screwed to the bores 18 in the recesses 16, as shown in FIG. 4, for example. The through bores 22 are designed to be coaxial with the bores 18 in the recesses 16. In particular, two mixing blades 15 can be fastened diametrically to a square recess 16, the fastening being carried out in such a way that the leg ends of the mixing blades 15 fastened opposite each other do not exert any pressure on one another.

This can be achieved, for example, in that there is still a free space between the leg ends of the opposing mixing blades 15.

The mixing blades 15 are cuboid and can have straight or inclined longitudinal sides 23. It can be advantageous if the mixing chamber 10 comprises a combination of different mixing blades 15, for example with mixing blades 15 with inclined and straight side surfaces 23. In addition, they can be designed to be slightly tapered, i.e. the narrow side 25 provided at the free end of a mixing blade 15 is designed to be slightly wedge-shaped. The narrow side can also run straight.

The base surfaces 24 of a mixing blade 15 are preferably located in a plane aligned transversely axially to the longitudinal axis of the shaft 6. In addition, the base surfaces 24 of the mixing blades 15 provided in the mixing chamber 10 are parallel to one another, so that basically the base surface 24 of one mixing blade 15 is opposite the base surface 24 of the next-but-one mixing blade 15. The mixing blades 15 arranged in adjacent recesses 16 are advantageously offset from one another at an angle of 90°. This results in, for example, four rows of mixing blades 15 arranged one behind the other in the mixing chamber 10, the rows being at an angle of 90° to one another, as shown in FIG. 3. In the embodiment shown, the mixing blades 15 of every third recess 16 are opposite one another.

In order to prevent the rotating mixing blades 15 from rubbing against the side walls 3, 4, a spacer sleeve which is pushed onto the shaft 6 can be arranged on each of the shaft ends provided in the mixing chamber 10.

The mixer 1 is used as a thermokinetic mixer 1. Substantially any plastics waste including, for example, mixed plastics material, polymer mixtures, thermoplastics, and thermoset waste materials can be used. After the melt mixing using the mixer 1, the compound can be discharged from the mixer 1 and processed in further steps to usable products, such as railway sleepers. The plastics parts are introduced into the feed chamber 11 through the opening 12. The introduced plastics parts then reach the mixing chamber 10 using a conveying means. The speed of rotation of the shaft 6 can vary from below 1500 revolutions per minute to over 4000 revolutions per minute. The choice of shaft rotation speed depends on the plastics parts and process parameters used.

Due to the rapidly rotating shaft 6 and consequently the mixing blades 15, the plastics parts are mixed and comminuted. On the one hand, the plastics parts are sheared by the mixing blades 15 rotating rapidly with the shaft 6. On the other hand, there are collisions between plastics parts, between plastics parts and the mixing blades 15, and between plastic parts and the inner wall of the mixing chamber 10. This results in the heating and melting of the plastics parts, so that a melted mixture of the plastics parts is created. Depending on the plastics parts introduced, the process parameters are selected in such a way that the process is stopped after a defined process time or when a defined temperature is reached. The melt-mixed material can be removed from the mixing chamber 10 via an opening arranged on the underside of the mixing trough 13 and designed as an outlet opening. Since the mix material is in a viscous state, it is possible for the mix material to flow out through the opening. The mix material can be removed from the mixing chamber 10 during operation, i.e. while the shaft 6 is rotating, it being advantageous to reduce the speed of rotation. At the same time, new mix material can be fed from the feed chamber 11 to the mixing chamber 10 with the aid of the conveying means.

A substantial advantage of the invention is that, for example, for maintenance of the shaft 6 or the mixing blades 15, the housing cover can be removed and the mixing blades 15 can be exchanged simply by loosening the fastening means 17. This allows individual mixing blades 15 to be exchanged in a simple manner. In addition, only a few fastening means 17 for fastening to the shaft 6 are necessary for the Y-shaped mixing blades 15 with the legs 20. Furthermore, the mixing blades 15 can be turned over; in other words, if, for example, one side, in particular a base surface 24, of a mixing blade 15 is damaged or worn, the mixing blade 15 can be turned around and used again.

The invention claimed is:

1. A thermokinetic mixer for melt mixing plastics waste, comprising:

a housing enclosing a mixing chamber configured to receive mix material, a shaft protruding through the mixing chamber and connectable to a drive unit and mixing blades protruding radially from the shaft in the mixing chamber, wherein each mixing blade has a cuboid free end protruding into the mixing chamber and an opposite end opposite the free end, wherein the opposite end is Y-shaped having first and second legs, wherein each of the first and second legs has at least one through bore, wherein the first and second legs form a wedge-shaped recess, wherein polygonal recesses are provided in the shaft, wherein a width and length of the first and second legs are adapted to a width and length of the polygonal recesses such that the wedge-shaped recess fits flush into the polygonal recesses of the shaft, and wherein the first and second legs are fastened in the recesses by fasteners protruding through the through bores.

2. The thermokinetic mixer according to claim 1, wherein the mixing blades are made from hard steel, chilled cast iron, Hardox or a combination thereof.

3. The thermokinetic mixer according to claim 1, wherein the shaft is designed so as to be round at least in portions.

4. The thermokinetic mixer according to claim 1, wherein cooling is provided in the housing.

5. The thermokinetic mixer according to claim 1, wherein a wall of the housing forms the mixing chamber and can be brought into contact with the mix material, wherein the wall comprises a wear plate made from hard steel, chilled cast iron, Hardox or a combination thereof.

6. The thermokinetic mixer according to claim 1, wherein the mixing blades are arranged on the shaft in such a way that adjacent mixing blades are arranged so as to be offset by 90° from one another.

7. The thermokinetic mixer according to claim 1, wherein the shaft is designed to have at least polygonal portions and the polygonal recesses encompass surfaces of the polygonal portions.

8. The thermokinetic mixer according to claim 7, wherein, in each of the surfaces of the polygonal portions, at least one bore is provided for receiving a fastener of the fasteners protruding through the mixing blades.

9. The thermokinetic mixer according to claim 1, wherein the mixing blades are arranged in the mixing chamber in such a way that base surfaces of the mixing blades lie in a plane aligned transversely to the shaft.

10. The thermokinetic mixer according to claim 9, wherein the mixing blades are provided in the mixing chamber so as to be arranged one behind the other in rows and the base surfaces of the mixing blades are aligned parallel to one another.

11. The thermokinetic mixer according to claim 1, wherein the mixing chamber is cylindrical and comprises a mixing trough and a mixing chamber cover which can be fastened to the mixing trough.

12. The thermokinetic mixer according to claim 11, wherein the mixing trough has an openable flap through which the mix material can be discharged.

13. The thermokinetic mixer according to claim 1, wherein a feed chamber is connected upstream of the mixing chamber.

14. The thermokinetic mixer according to claim 13, wherein the feed chamber has an opening on an upper side of the feed chamber for feeding the mix material.

15. The thermokinetic mixer according to claim 1, wherein the housing comprises at least first, second, and third side walls arranged axially one behind the other, wherein the first, second, and third side walls are aligned substantially parallel to one another and can be fastened to a housing base plate aligned substantially perpendicularly to said side walls.

16. The thermokinetic mixer according to claim 15, wherein the first side wall and the second side wall form side walls of the mixing chamber.

17. The thermokinetic mixer according to claim 15, wherein each of the first side wall and the second side wall or the third side wall has a bearing for supporting the shaft.

* * * * *